Patented May 6, 1941

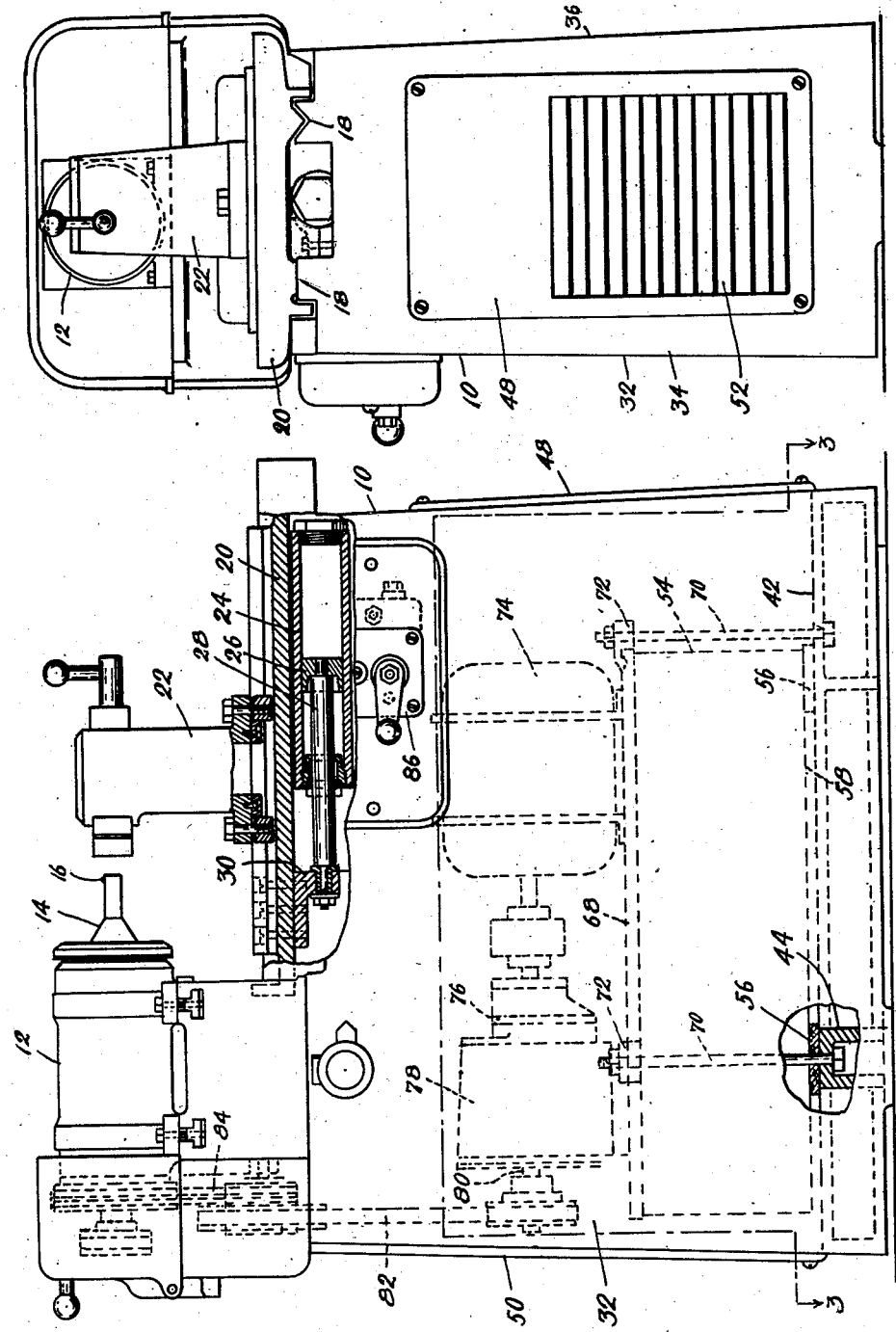

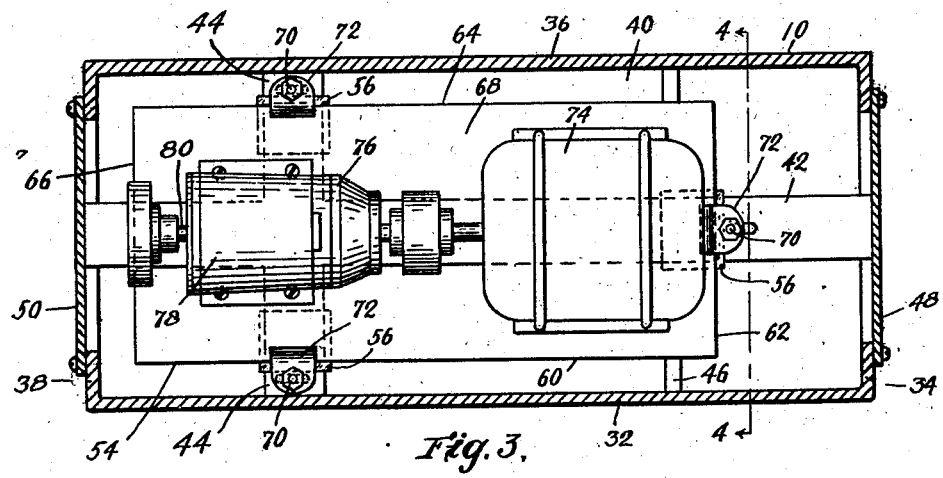
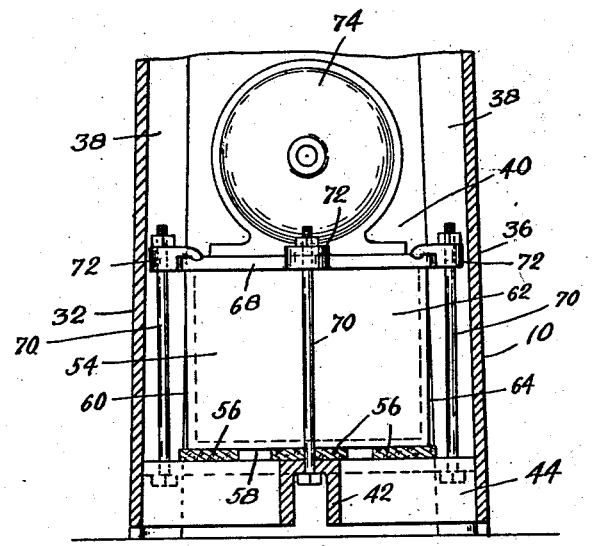

2,241,014

UNITED STATES PATENT OFFICE 2,241,014

HYDRAULICALLY OPERATED MACHINE TOOL

Eric J. Hirvonen, Worcester, Mass., assignor to Leland-Gifford Company, Worcester, Mass., a corporation of Massachusetts Application September 22, 1939, Serial No. 296,082

2 Claims. (Cl. 77—1)

This invention relates to hydraulically operated machine tools, such as boring machines, grinding machines and the like, especially characterized by the extreme accuracy of the work produced thereby.

When a machine tool of the above type is intended to produce work, and especially duplicate pieces, accurate within one ten thousandths part of an inch extreme care must be paid not only to the initial manufacture of the machine but even to the cutting tool for it is apparent that if the cutting tool does not produce a surface smooth enough to measure within a ten thousandths the finer accuracy inherent in the machine is not evident. Furthermore, it is necessary not only to provide this accuracy initially but to maintain it throughout a succession of duplicate work pieces and indefinitely.

A hydraulically operated machine tool has a base on which is mounted a cutting tool holder and a work support, one of which is movable relatively to the other by a hydraulic motor, usually a cylinder and a piston therein. The motor is supplied with operating fluid, usually oil, by a motor driven pump such as a gear or other constant displacement pump that takes oil from a storage tank and delivers it under suitable pressure under control by appropriate valve mechanism to the motor. The machine base is commonly hollow and it is common to utilize the base as an oil reservoir for the hydraulic system, the side and bottom walls of the base forming the equivalent walls of the reservoir.

The oil in the reservoir is subject to repeated circulation by the pump and is discharged at high pressure through orifices and passages and hence becomes heated during the operation of the machine. This heat is transmitted by direct contact to the walls of the base and thereby causes them to expand with an increase of temperature and to contract with a decrease of temperature. Thus the dimensions of the base undergo frequent changes of dimensions which is not conducive to maintenance of working accuracy. For instance, an increase in temperature of only ten degrees centigrade will expand a linear inch of cast iron, of which the machine bases are commonly made, more than the desired machine accuracy and, since the bases have sizable dimensions it can be appreciated that a small change of temperature can produce a relatively great change of dimensions. Furthermore, the different parts of the base have different thicknesses or have different masses attached thereto so that different parts of the machine are heated and cooled unequally. Thus, the effect of the heated oil is to throw the operative parts of the machine out of their intended relation and impair the accuracy of the work produced by the machine. The errors introduced by the temperature of the oil may be aggravated in a machine that is started and stopped frequently for loading and unloading the work and where during the idle periods the machine tends to cool so that successive work pieces are not machined to the same degree of accuracy.

It is an object of the present invention to eliminate the above enumerated troubles due to oil temperatures by storing the oil in the base of the machine in a reservoir or tank that is structurally separate from the base and thermally insulated therefrom so that variations of oil temperatures have a negligible influence on the machine accuracy, and further to provide for the ventilation of the base and the circulation of air between the oil reservoir and the walls of the base to assist in maintaining an unvariable base temperature.

Another object is generally to improve the construction and operation of hydraulically operated machine tools.

Fig. 1 is a front elevation, partly in section, of a hydraulically operated boring machine embodying the invention.

Fig. 2 is an end elevation of the machine of Fig. 1.

Fig. 3 is a section taken along line 3—3 of Fig. 1.

Fig. 4 is a section taken along line 4—4 of Fig. 3.

The hydraulically operated machine tool herein chosen for illustrating the invention is a boring machine of extreme accuracy, producing work accurate to one ten thousandth part of an inch.

The boring machine comprises a base 10 upon one end of which is mounted a spindle housing 12 containing a spindle 14 driving a cutting tool 16. The top part of the base is provided with ways 18 on which a carriage 20 is reciprocable in the line of and toward and away from the spindle. The carriage supports a suitable fixture 22 for engaging and supporting the work to be operated on by the tool or cutter 16.

The carriage 20 is reciprocated hydraulically by a hydraulic motor including a cylinder 24 fixed to the top part of the base, under the carriage, and having a piston 26 therein the piston rod 28 of which extends through one end of the cylinder and at its end part has a fixed driving connection 30 with the carriage.

The base 10 of the machine is hollow and its four vertical walls 32, 34, 36, 38 enclose a compartment 40 that is closed at the top part and substantially open at the bottom part except where the bottom part is traversed by the medial longitudinal rib 42 and the wide transverse rib 44 and the narrow transverse rib 46. The end walls 34 and 38 have large openings therein provided with removable cover plates 48 and 50 respectively formed with louvres 52 through which the compartment 40 is ventilated.

In accordance with this invention the oil tank or reservoir 54 is separate from the machine base and is located within the base, supported upon the aforesaid ribs 42, 44, and 46 through interposed, heat insulating relatively thick cork pads or blocks 56. Thus the bottom wall 58 of the tank is supported out of heat transferring relation with said ribs. The vertical side walls 60, 62, 64, 66 of the tank are substantially spaced from the associated confronting walls 32, 34, 36, 38 of the base so that air can circulate freely therebetween to isolate the tank thermally from the base. The top of the tank is closed by a cover 68 and the tank is bolted to the base by long tie rods 70 which are connected with the ribs 42 and 44 and pass through clips 72 that bear on the cover. The tie rods are long so that heat transference therethrough is negligible.

The hydraulic system also includes a pump and spindle driving and control unit mounted on the tank cover within the base. Said unit includes a driving electric motor 74 which drives a unitary mechanism including an oil pump 76 of the constant displacement gear type and a clutch and brake mechanism 78 which controls the rotation of a drive shaft 80 that drives the spindle 14 through belts 82 and 84. The oil pump is rotated continuously with the motor 74 while the spindle 14 can rotate or be held stationary by the clutch and brake mechanism 78 the construction of which is not herein essential to an understanding of the present invention.

The oil pump 76 takes oil from the tank 54 and supplies oil under elevated pressure to an accumulator contained in a portion of the tank and not herein necessarily illustrated from whence the pressure oil passes under control of a valve mechanism generally indicated at 86 to the table reciprocating cylinder 24, the exhaust oil returning to the tank. As set forth above the oil becomes heated which raises the temperature of the tank. Since, however, the tank is thermally insulated from the machine base by the arrangement herein described, the base is not deleteriously influenced by the oil temperature and hence the machine accuracy is preserved.

I claim:

1. A hydraulically operated machine tool of the type carrying a self-contained internal reservoir, comprising a base, cutter and work holders thereon, a hydraulic motor for effecting relative movement between said holders, said base having a hollow lower part formed with side walls and with bottom members traversing the lower part of said hollow part and being rigid with certain of said side walls, an oil tank mounted upon said bottom members within said hollow part and having side walls freely spaced from said side walls providing thermally-insulating air spaces therebetween, thermally-insulating members interposed between said tank and said bottom members and upon which said tank rests, and means rigidly securing said tank in the aforesaid relation to said bottom members.

2. A hydraulically operated machine tool as in claim 1, said means rigidly securing said tank to said bottom members comprising bolts which are connected to the top part of the tank and to said bottom members and are long to minimize heat conduction therethrough from the tank to said bottom members.

ERIC J. HIRVONEN.